(12) United States Patent
MacDougall et al.

(10) Patent No.: US 7,894,061 B2
(45) Date of Patent: Feb. 22, 2011

(54) POLARIZATION BASED FIBER OPTIC DOWNHOLE FLOWMETER

(75) Inventors: Trevor Wayne MacDougall, Simsbury, CT (US); Paul Eric Sanders, Madison, CT (US)

(73) Assignee: Qorex LLC, Rocky Hill, CT (US)

( * ) Notice: Subject to any disclaimer, the term of this patent is extended or adjusted under 35 U.S.C. 154(b) by 300 days.

(21) Appl. No.: 12/142,258

(22) Filed: Jun. 19, 2008

(65) Prior Publication Data
US 2009/0314102 A1 Dec. 24, 2009

(51) Int. Cl.
*G01B 9/02* (2006.01)
*G01F 1/74* (2006.01)
*G02B 6/26* (2006.01)

(52) U.S. Cl. ............... 356/369; 356/477; 73/861.04; 73/861.17; 385/12; 250/227.18

(58) Field of Classification Search ............. 357/71–73, 357/369, 477, 28, 28.5; 73/861.17, 861.18, 73/861.04, 861.27, 32 A, 61.41; 250/269.1, 250/339.12, 227.17, 227.18
See application file for complete search history.

(56) References Cited

U.S. PATENT DOCUMENTS

| | | | |
|---|---|---|---|
| 4,976,157 A | 12/1990 | Berthold et al. | |
| 5,696,858 A * | 12/1997 | Blake | 385/12 |
| 6,275,284 B1 | 8/2001 | Kiel et al. | |
| 6,590,647 B2 * | 7/2003 | Stephenson | 356/301 |
| 6,601,458 B1 * | 8/2003 | Gysling et al. | 73/861.04 |
| 6,678,050 B2 * | 1/2004 | Pope et al. | 356/435 |
| 6,837,113 B1 * | 1/2005 | Freund et al. | 73/861.18 |
| 6,891,621 B2 * | 5/2005 | Berg et al. | 356/477 |
| 7,059,172 B2 * | 6/2006 | Gysling | 73/32 A |
| 2006/0245468 A1 * | 11/2006 | Hartog | 374/161 |

FOREIGN PATENT DOCUMENTS

| | | | |
|---|---|---|---|
| JP | 58206924 A | 12/1983 | |
| JP | 59068626 A | 4/1984 | |

* cited by examiner

*Primary Examiner*—Sang Nguyen
(74) *Attorney, Agent, or Firm*—McCormick, Paulding & Huber LLP

(57) ABSTRACT

A flow monitoring system includes a pipe for transporting a fluid therethrough. An optical fiber generally spirals about the pipe along a longitudinal portion having a predetermined length to serve as a single transducer for detecting flow information from the longitudinal portion. A linear polarizer/analyzer circuit communicates with the optical fiber. A light source communicates with the linear polarizer/analyzer circuit and generates a light signal along the optical fiber at a frequency greater than a period of a disturbance to flow past the predetermined length of the transducer. A reflector is disposed along the optical fiber for reflecting the light signal along the optical fiber. An optical detector communicates with the linear polarizer/analyzer circuit. The optical detector determines from the light signal dynamic events along the optical fiber indicative of flow disturbances passing by the transducer.

18 Claims, 2 Drawing Sheets

POLARIZATION BASED FIBER OPTIC DOWNHOLE FLOWMETER

FIELD OF THE INVENTION

The present invention is directed generally to flowmeters, and more particularly to devices for obtaining information pertaining to fluid flow along a pipe such as in oil and gas applications.

RELATED APPLICATION

This application is related to U.S. patent application Ser. No. 12/124,517, filed on May 21, 2008 entitled "Dynamic Polarization Based Fiber Optic Sensor", the disclosure of which is hereby incorporated by reference in its entirety.

BACKGROUND OF THE INVENTION

Most conventional flow measurement products, i.e. flowmeters, are challenged for use in downhole oil and gas applications because of the rugged environment and handling during installation. The most common flowmeter used in oil and gas is based on differential pressure across some obstruction in the flow path or pipe such as an orifice plate, venture or jet cone. As an example, see Baker Hughes product bulletin entitled "SureFlo-InForm" at www.productionquest.com. These flowmeters have several shortcomings that limit their use. The mechanical restriction of these flowmeters is not desirable, and presents a liability and an obstacle for running intervention and logging tools. In addition, these systems use electronic pressure transducers which are limited in their reliability at higher temperatures which precludes their use in many deeper, hotter wells.

Fiber optic solutions have emerged to address these shortcomings. These products include distributed temperature sensors (DTS). As an example, see Sensa brochure entitled "Reservoir Surveillance in a Different Light" at www.sensa.org. Such products measure temperature along a fiber in or around the production tubing of the well. By monitoring temperature changes in time, flow can be inferred or modeled. See, for example, WellDynamics brochure entitled "iFlow Flow Profiling Analysis Service" at www.welldynamics.com.

Another fiber optic product is the only direct flow measurement product offered by Weatherford. This flowmeter is based on an array of optical sensors attached on the outside of a sensor "sub" pipe unit that tracks the velocity of flow-induced disturbances acting on the pipe. Volumetric flow can be calculated from the fluid velocity and pipe dimensions. Based on quartz optical fibers, these two fiber optic solutions are suitable at high temperatures to address most wells, and are non-obstructive in taking measurements on the outside of the production tubing. However, the DTS solution is not a direct measurement and therefore is subject to significant error in being inferred from temperature changes in which the quality of measurement is heavily dependent upon the quality of temperature measurement and validity of the model for given geological, thermal and reservoir characteristics of the formation. In contrast, the optical array sensor delivers high quality and reliable flow information, but requires complex optical interrogation equipment, including expensive modulation and receiver modules, and relatively complex processing electronics and software. In addition the construction of the transducer and sensing fiber packaging becomes quite demanding in the precision of fiber lengths and fiber mounting or coil winding which becomes a significant cost component of the system.

In view of the foregoing, there is an ongoing need for a simpler and more inexpensive approach to accurately obtaining information pertaining to fluid flow along a pipe.

SUMMARY OF THE INVENTION

In a first aspect of the present invention, a flow monitoring system includes a pipe configured for transporting a fluid such as oil or gas therethrough. An optical fiber generally spirals a plurality of revolutions circumaxially about the pipe along a longitudinal portion having a predetermined length to serve as a single transducer for detecting flow information originating along the longitudinal portion. A linear polarizer/analyzer circuit is configured to communicate with the optical fiber. A light source communicates with the linear polarizer/analyzer circuit and is configured for generating a light signal along the optical fiber at a frequency greater than a period of a disturbance to flow past the predetermined length of the transducer. A reflector is disposed along the optical fiber for reflecting back the light signal along the optical fiber. An optical detector communicates with the linear polarizer/analyzer circuit. The optical detector is configured for optically determining from the light signal dynamic events along the optical fiber indicative of flow disturbances passing by the transducer.

In a second aspect of the present invention, a flow monitoring system includes a pipe configured for transporting a fluid therethrough. An optical fiber generally spirals a plurality of revolutions circumaxially about the pipe along a longitudinal portion having a predetermined length to serve as a single optical fiber sensing element for detecting flow information originating along the longitudinal portion. One or more fiber Bragg grating reflectors are arranged along the optical fiber sensing element. A phase-sensitive optical detector is in communication with the optical fiber sensing element.

DETAILED DESCRIPTION OF THE PREFERRED EMBODIMENTS

The process of oil and gas production involves management of fluid flow, both producing and injected fluids, to promote downhole reservoir drainage and flow of producing fluids to surface, which requires flow information. This flow information includes knowledge about the mass and volume velocity of the fluids being transported, as well as possible knowledge of its composition. This flow information assists oil and gas operators make process changes and in some cases adjustment of flow controls to target a specific portion of the reservoir for drainage. Flow information becomes especially important in multi-lateral wells to understand contribution from each zone. Downhole flow sensors (flowmeters) in combination with flow controls (valves) allow operators to review flow data and make informed decisions on redirecting inflows to producing zones and away from marginal or multi-phase (water) zones that inhibit production. Such instrumented and equipped wells, commonly referred to as intelligent or smart wells, greatly enhance production efficiencies and ultimate recovery.

Figure 1:
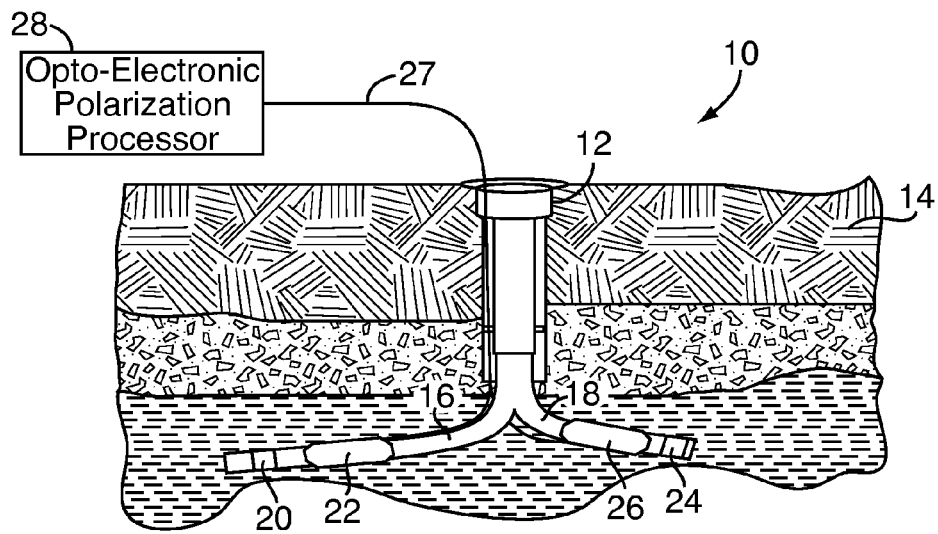
FIG. 1 schematically illustrates a conventional flowmeter system.

FIG. 1, for example, shows a conventional flow monitoring system 10 which includes a pipe 12 extending downwardly into the ground 14 for drawing oil or gas therethrough toward the surface for processing. As shown in FIG. 1, the pipe 12 bifurcates into a first branch 16 and a second branch 18 in order to access oil or gas from a plurality of locations. The first branch 16 of the pipe 12 accommodates therein a first flow valve 20 and a first flow monitoring device 22. Similarly, the second branch 18 of the pipe 12 accommodates therein a second flow valve 24 and a second flow monitoring device 26. The first and second flow monitoring devices 22, 26 each communicates via an optical fiber 27 with an opto-electronic polarization processor 28 disposed above the surface. The opto-electronic polarization processor 28 provides data used for the adjustment of the first and second flow valves 20, 24 based on flow information received from the first and second flow monitoring devices 22, 26.

Figure 2A:
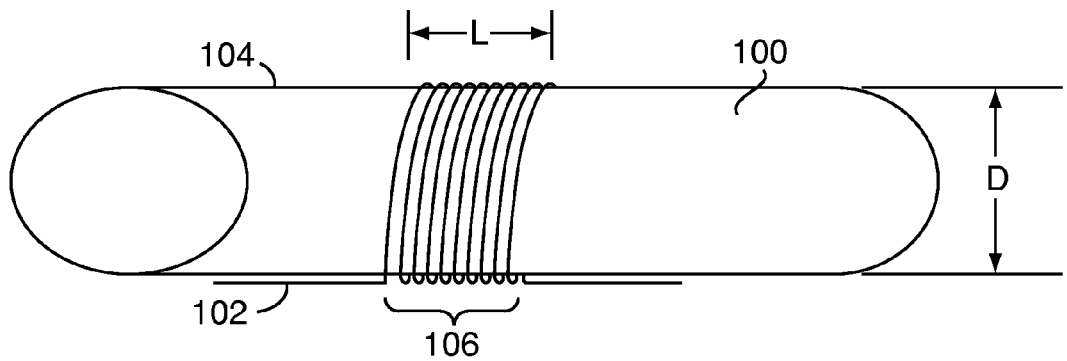
FIG. 2A is a side view of an optical fiber sensor or transducer extending about a pipe in accordance with the present invention.
Figure 2B:
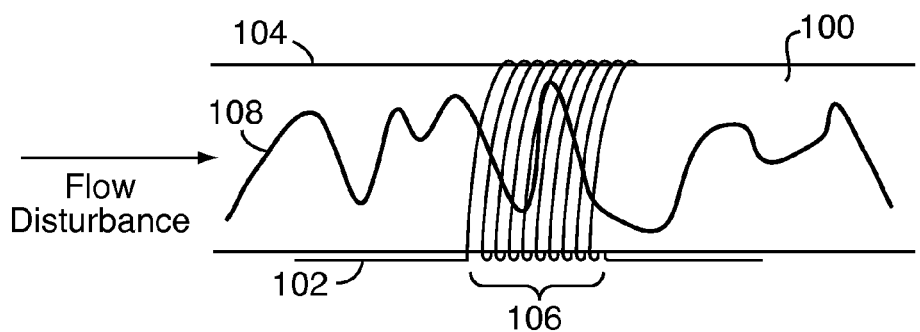
FIG. 2B schematically illustrates a wavelength pressure disturbance passing through a pipe and by a sensor in accordance with the present invention.

With references to FIGS. 2A and 2B, the solution to be described in accordance with the present invention uses an optical system to measure the velocity of a vibration signal associated with fluid flow to determine the flow of fluids in pipes. The system is configured to detect this vibration signal from the outside of the pipe thus avoiding any interaction or restriction of the fluid flow. The sensor in its simplest configuration includes a single transducer which is designed so that its transduction length is longer than the spatial wavelength of the longest wavelength pressure disturbance to be measured.

FIGS. 2A and 2B illustrate, for example, a longitudinal portion of a pipe 100. An optical fiber 102 extends generally longitudinally along and adjacent to an outer surface 104 of the pipe 100. The optical fiber 102 communicates with a signal processor such as the processor 28 shown in FIG. 1. A portion 106 of the optical fiber 102 having a longitudinal or transduction length L spirals or otherwise generally extends circumaxially about the pipe 100 a plurality of revolutions so as to form a single transducer 106 for optically detecting flow disturbances within the pipe and passing by the transducer. FIG. 2B illustrates a pressure disturbance 108 passing by the transduction length L of the transducer 106. The transduction length L of the transducer 106 is predetermined to be larger than the spatial wavelength of the longest wavelength of the pressure disturbance to be measured. A transducer can also be implemented by laying the optical fiber 102 along the length of the pipe 100 to form a distributed type sensor. This is particularly attractive for long lengths of production tubing since this provides many sensing regions which can be processed using well known array processing techniques to provide very accurate flow information.

Figure 3:
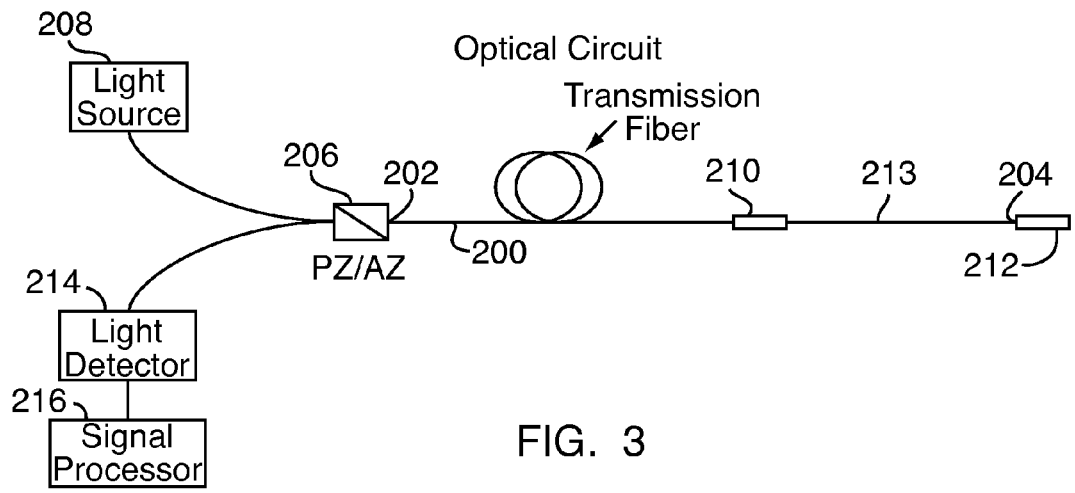
FIG. 3 schematically illustrates an optical circuit of a single optical fiber sensor in accordance with the present invention.

An exemplary optical circuit configuration for a single transducer or sensor is illustrated in FIG. 3. An optical fiber sensor configuration as part of a flow monitoring system includes a waveguide such as an optical fiber 200 having a first longitudinal end 202 and a second longitudinal end 204. A linear polarizing component is configured to communicate with the optical fiber 200. The linear polarizing component includes a polarizer/analyzer circuit 206 coupled to the first longitudinal end 202 of the optical fiber 200. A light source 208 communicates with the polarizer/analyzer circuit 206 for generating a light signal along the optical fiber 200. A plurality of fiber Bragg grating (FBG) reflectors 210, 212 are spaced along the optical fiber 200. As shown in FIG. 3 by way of example, two fiber Bragg grating reflectors 210, 212 are spaced along the optical fiber 200 adjacent to the second longitudinal end 204 such that a portion of the optical fiber between the first fiber Bragg grating reflector 202 and the second fiber Bragg grating reflector 204 serves as a polarization sensing fiber or transducer 213. Although two fiber Bragg grating reflectors are shown by way of example, a different number of fiber Bragg grating reflectors can be implemented without departing from the scope of the present invention.

A phase-sensitive optical or light detector 214 communicates with the polarizer/analyzer circuit 206 for sensing the reflected light signal. A signal processor 216 such as the processor as described with respect to FIG. 1 communicates with the light detector 214 for processing information extracted from the reflected light signal.

Flow vibration induced birefringence is measured by the light detector 214 and analyzed by the signal processor 216 in the time domain in order to determine the bulk velocity of the fluid flowing past the transducer 213.

Figure 4:
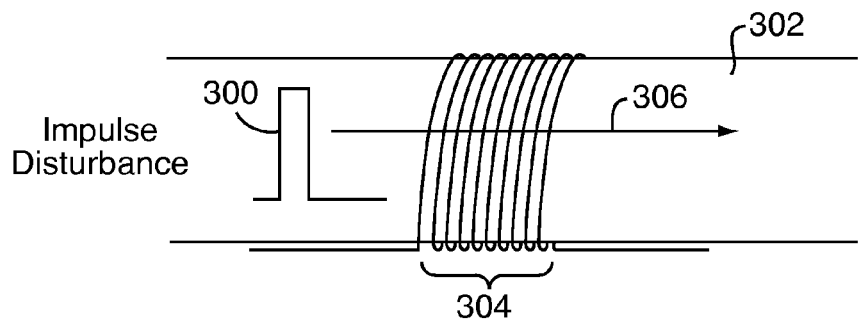
FIG. 4 schematically illustrates an impulse disturbance passing through a pipe and by an optical fiber sensor in accordance with the present invention.

The method used for determining the velocity of the fluid is explained by monitoring the flow of an impulse type event through the sensing region. This is illustrated in FIG. 4 which shows an impulse disturbance waveform 300 moving through a pipe 302 and passing by a transducer 304 in the direction indicated by arrow 306.

The impulse disturbance waveform 300 creates a birefringence modulation which is measured by the optical configuration of the flow monitoring system. Similar to a "strobing" effect this impulse birefringence modulation is imaged repeatability at a higher rate than its traveling velocity (on the order of kHz). The position of the impulse is mapped in time by a signal processor, and its position change as a function of time or velocity is calculated by the signal processor using this information. This is shown by way of example in FIG. 5.

Figure 5:
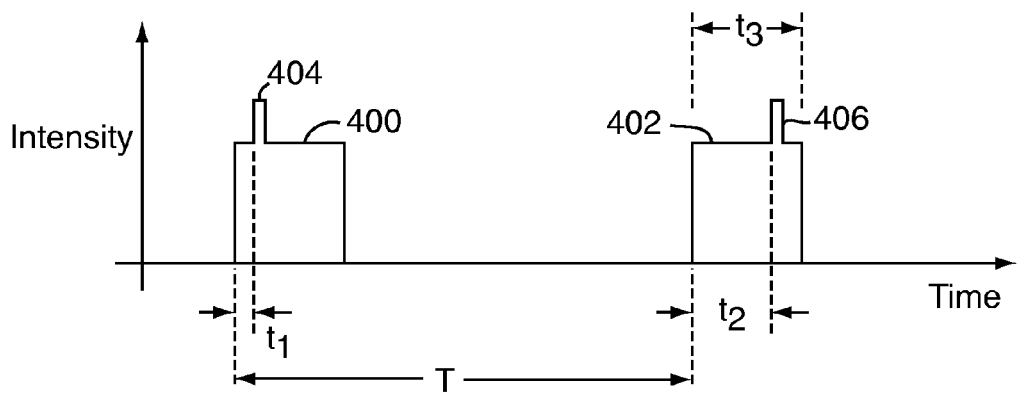
FIG. 5 is a graph illustrating the shape and position of an impulse disturbance through a pipe as a function of time.

As shown in FIG. 5, pulsing waveforms, such as successive pulsing waveforms 400, 402 having a period T between waveforms are generated by a light source and propagated along an optical fiber wound about a pipe. An impulse disturbance traveling through the pipe is picked up by a transducer as an impulse birefringence modulation 404, 406 on the respective source pulsing waveforms 400, 402. The velocity of the impulse disturbance is determined by the signal processor as follows:

$$T = \text{Period of Source pulsing waveform}$$

$$t3 = \frac{Dpipe(m) * \Pi * \text{\# wraps}}{\frac{3 * 10^8 \text{ m/s}}{n}}$$

$$\text{Velocity} = \frac{\frac{(t_2 - t_1)}{t_3} * L}{(T + t_2 - t_1)}$$

where: Dpipe(m) is the diameter of the pipe in meters,

\# wraps is the number of times optical fiber is wrapped around the pipe, n is the index of refraction of the optical fiber, t1 and t2 are mapping in time of the respective occurrence of impulse birefringence modulation on successive pulsing waveforms as measured by the optical system of the present invention;

t3 is the duration of each pulsing waveform; and

L is the longitudinal or transduction length of optical fiber wrapping along the pipe.

The optical fiber is preferably a single-mode SMF-28 type optical fiber which is, for example, acrylate coated, polyimide coated or carbon polyimide coated. The index or refraction of such optical fiber is typically about 1.45. The number of wraps of optical fiber about the pipe is typically in the range of about 10 to about 1000. The diameter of pipes whose flow within is being analyzed is typically about 1 inch to about 6 inches. The longitudinal length of optical fiber wrapping about the pipe is typically about 0.5 inch to about 6 inches.

In addition to these configurations there are techniques which can enhance the sensitivity of the optical fiber as well as "tune" its vibration response to specific frequency bands of interest that can be coupled to provide an optimized sensing system. Examples of techniques include optimized fiber mode parameters and optimized fiber coatings. Furthermore, the high rate imaging or "strobing" interrogation method can be also be applied to an interferometric transducer such as, for example, a pair of fiber Bragg gratings to define a Fabry-Perot interferometer or similar arrangement.

Unlike conventional flowmeters, the proposed solution does not obstruct the flow path and can operate at high temperatures in which the downhole sensing section is a single quartz optical fiber. The use of a polarization based optical sensor in the preferred embodiment can be used to directly measure flow vibration signals and subsequently provide flow information along the length of a production tube or at discreet locations. Like fiber optic DTS sensors, the sensing element is the fiber itself; however the proposed solution makes a direct flow velocity measurement as compared to indirect modeled or inferred measurements by optical DTS systems.

The proposed solution performs the velocity measurement on a single optical sensing fiber, rather than conventional multiple discrete sensors in the optical array sensor that uses phase sensitive optical interferometers. The conventional approach requires complicated processing and pulsing electronics as well as ultra precise location of sensing fiber lengths. Both of these issues limit the cost effectiveness of the interferometric approach from both a hardware/software complexity and manufacturing/test perspective.

While the high rate imaging or "strobing" interrogation method also can be applied to an interferometric implementation as discussed in the previous section, the polarization architectures presented in the preferred embodiment of the proposed solution are relatively simple to manufacture and require low cost signal processing electronics. In addition the light source required for the polarization sensor can be a broad band low coherence source as compared to the more complex laser sources needed for the interferometric architectures.

Although the invention has been described and illustrated with respect to exemplary embodiments thereof, the foregoing and various other additions and omissions may be made therein and thereto without departing from the spirit and scope of the present invention.

What is claimed is:

1. A flow monitoring system comprising:
    a pipe configured for transporting a fluid therethrough;
    an optical fiber generally spiraling a plurality of revolutions circumaxially about the pipe along a longitudinal portion having a predetermined length to serve as a single transducer for detecting flow information originating along the longitudinal portion;
    a linear polarizer/analyzer circuit configured to communicate with the optical fiber;
    a light source communicating with the linear polarizer/analyzer circuit and configured for generating a light signal along the optical fiber at a frequency greater than a period of a disturbance to flow past the predetermined length of the transducer;
    a reflector disposed along the optical fiber for reflecting back the light signal along the optical fiber; and
    an optical detector communicating with the linear polarizer/analyzer circuit, the optical detector being configured for optically determining from the light signal dynamic events along the optical fiber indicative of flow disturbances passing by the transducers;
    wherein the predetermined length of the transducer is larger than a spatial wavelength of the longest wavelength of a flow disturbance to be measured.

2. A flow monitoring system as defined in claim 1, wherein the optical detector is configured for optically determining from flow vibration induced birefringence of the light signal dynamic events along the optical fiber indicative of flow disturbances passing by the transducer.

3. A flow monitoring system as defined in claim 1, further comprising a signal processor communicating with the optical detector, the signal processor being configured for analyzing the light signal to determine the bulk velocity of fluid flowing through the pipe.

4. A flow monitoring system as defined in claim 3, wherein the signal processor is configured for analyzing in the time domain flow vibration induced birefringence to determine the bulk velocity of fluid flowing through the pipe.

5. A flow monitoring system as defined in claim 3, wherein:
    the light source generates a pulsing light signal to create a strobing effect on a flow disturbance via vibration induced birefringence of the pulsing light signal; and
    the signal processor is configured to map from the strobing effect a position of a flow disturbance passing by the transducer.

6. A flow monitoring system as defined by claim 1, wherein the optical fiber is single-mode SMF-28 type optical fiber.

7. A flow monitoring system as defined in claim 1, wherein the optical fiber is one of acrylate coated, polyimide coated, and carbon polyimide coated.

8. A flow monitoring system as defined in claim 1, wherein the optical fiber has an index of refraction of about 1.45.

9. A flow monitoring system as defined in claim 1, wherein the plurality of revolutions generally is about 10 to about 1000.

10. A flow monitoring system as defined in claim 1, wherein the diameter of the pipe generally is about 1 inch to about 6 inches.

11. A flow monitoring system as defined in claim 1, wherein the predetermined length of the transducer is about 0.5 inch to about 6 inches.

12. A flow monitoring system as defined in claim 1, wherein the reflector includes a plurality of fiber Bragg grating reflectors spaced along the optical fiber.

13. A flow monitoring system as defined in claim 1, wherein the reflector includes two fiber Bragg grating reflectors spaced along the optical fiber.

14. A flow monitoring system comprising:
    a pipe configured for transporting a fluid therethrough;
    an optical fiber generally spiraling a plurality of revolutions circumaxially about the pipe along a longitudinal portion having a predetermined length to serve as a single optical fiber sensing element for detecting flow information originating along the longitudinal portion;

one or more fiber Bragg grating reflectors arranged along the optical fiber sensing element; and a phase-sensitive optical detector in communication with the optical fiber sensing element;

wherein the predetermined length of the single optical fiber sensing element is larger than a spatial wavelength of the longest wavelength of a flow disturbance to be measured.

15. A flow monitoring system as defined in claim 14, wherein the optical detector is configured for optically determining from flow vibration induced birefringence of the light signal dynamic events along the optical fiber indicative of flow disturbances passing by the transducer.

16. A flow monitoring system as defined in claim 14, further comprising a signal processor communicating with the optical detector, the signal processor being configured for analyzing the light signal to determine the bulk velocity of fluid flowing through the pipe.

17. A flow monitoring system as defined in claim 16, wherein the signal processor is configured for analyzing in the time domain flow vibration induced birefringence to determine the bulk velocity of fluid flowing through the pipe.

18. A flow monitoring system as defined in claim 16, wherein:

the light source generates a pulsing light signal to create a strobing effect on a flow disturbance via vibration induced birefringence of the pulsing light signal; and the signal processor is configured to map from the strobing effect a position of a flow disturbance passing by the transducer.

\* \* \* \* \*